(12) United States Patent
Tsai

(10) Patent No.: US 7,020,936 B2
(45) Date of Patent: Apr. 4, 2006

(54) UNIVERSAL CARRY STRAP

(76) Inventor: Ming-Chou Tsai, No. 77, Yuehpei Rd., Yuehmei Li, Homei Chen, Changhua Hsien (TW)

( * ) Notice: Subject to any disclaimer, the term of this patent is extended or adjusted under 35 U.S.C. 154(b) by 99 days.

(21) Appl. No.: 10/865,279

(22) Filed: Jun. 9, 2004

(65) Prior Publication Data

US 2005/0273985 A1 Dec. 15, 2005

(51) Int. Cl.
*A44B 21/00* (2006.01)
*A45F 3/14* (2006.01)
*B65D 33/00* (2006.01)

(52) U.S. Cl. .................. 24/302; 24/17 A; 24/16 PB; 224/258

(58) Field of Classification Search ............... None
See application file for complete search history.

(56) References Cited

U.S. PATENT DOCUMENTS 1,829,613 A * 10/1931 Sato ..................... 24/17 AP
3,913,179 A * 10/1975 Rhee ..................... 24/16 PB
4,578,843 A * 4/1986 Lewis ..................... 24/579.09
5,970,585 A * 10/1999 Scholey ..................... 24/16 PB

* cited by examiner

*Primary Examiner*—Robert J. Sandy
(74) *Attorney, Agent, or Firm*—Dellett & Walters

(57) ABSTRACT

A universal carry strap includes a woven strip, an adjustment buckle and a shuttle buckle. The strip has two opposite ends onto which the adjustment and the shuttle buckles are integrally formed by molding plastic. The adjustment buckle has multiple adjusting through holes. The shuttle buckle passes selectively through the adjusting through holes. Consequently, the carry strap will provide a robust connection and be easy, quick and convenient to be connected to an object, such as a case having a first and a second connecting hook ring by passing the shuttle buckle through the first connecting hook ring, selectively through the adjusting through holes in the adjustment buckle and eventually through the second connecting hook ring to engage the second connecting hook ring.

3 Claims, 8 Drawing Sheets

UNIVERSAL CARRY STRAP

BACKGROUND OF THE INVENTION

1. Field of the Invention

The present invention relates to a carry strap, and more particularly to a universal carry strap that is suitable for connecting to various objects to carry the objects.

2. Description of Related Art

With reference to FIG. 8, a conventional shoulder carry strap (70) for carrying a case (60) in accordance with the prior art has two opposite ends (701) that connect to the case (60). The case (60) generally comprises two connecting devices such as two hook rings (61) for establishing a connection between the case (60) and the carry strap (70).

The ends (701) of the carry strap (70) are respectively bound around the hook rings (61) with stitches so that the carry strap (70) can be used to carry the case (60). Alternatively, the ends (701) of the carry strap (70) may have clasps (not shown) to respectively hook the hook rings (61).

However, using the stitches to joint the ends (701) and a segment of the carry strap (70) together will cause difficulty in replacing the carry strap (70) from the case (60) when the carry strap (70) is worn or snapped. The connection between the stitched ends (701) and a segment of the carry strap (70) is weak so that the conventional carry strap (70) cannot be used to carry heavy objects.

Furthermore, once the carry strap (70) is sewed with the case (60), the carry strap (70) is not easy to be removed from the case (60) when a person does not require using the carry strap (70) to carry case (60). Furthermore, the carry strap (70) cannot be used to connect to another object to carry the object. Therefore, the utilization of the conventional carry strap (70) is limited.

To overcome the shortcomings, the present invention provides a universal carry strap that is suitable for connecting to various objects to carry conveniently the connected object to mitigate or obviate the aforementioned problems.

SUMMARY OF THE INVENTION

The main objective of the invention is to provide a universal carry strap that provides a robust connection to and is easy, quick and convenient to be connected to various objects for a person to carry the object.

A universal carry strap includes a woven strip, an adjustment buckle and a shuttle buckle. The strip has two opposite ends onto which the adjustment and the shuttle buckles are integrally formed by injection thermoplastic molding. The adjustment buckle has multiple adjusting through holes. The shuttle buckle passes selectively through the adjusting through holes to provide a length adjustment of the carry strap when the carry strap is connected to an object, such as a case, a battery pack, a beverage bottle etc.

Other objectives, advantages and novel features of the invention will become more apparent from the following detailed description when taken in conjunction with the accompanying drawings.

DETAILED DESCRIPTION OF PREFERRED EMBODIMENT

Figure 1:
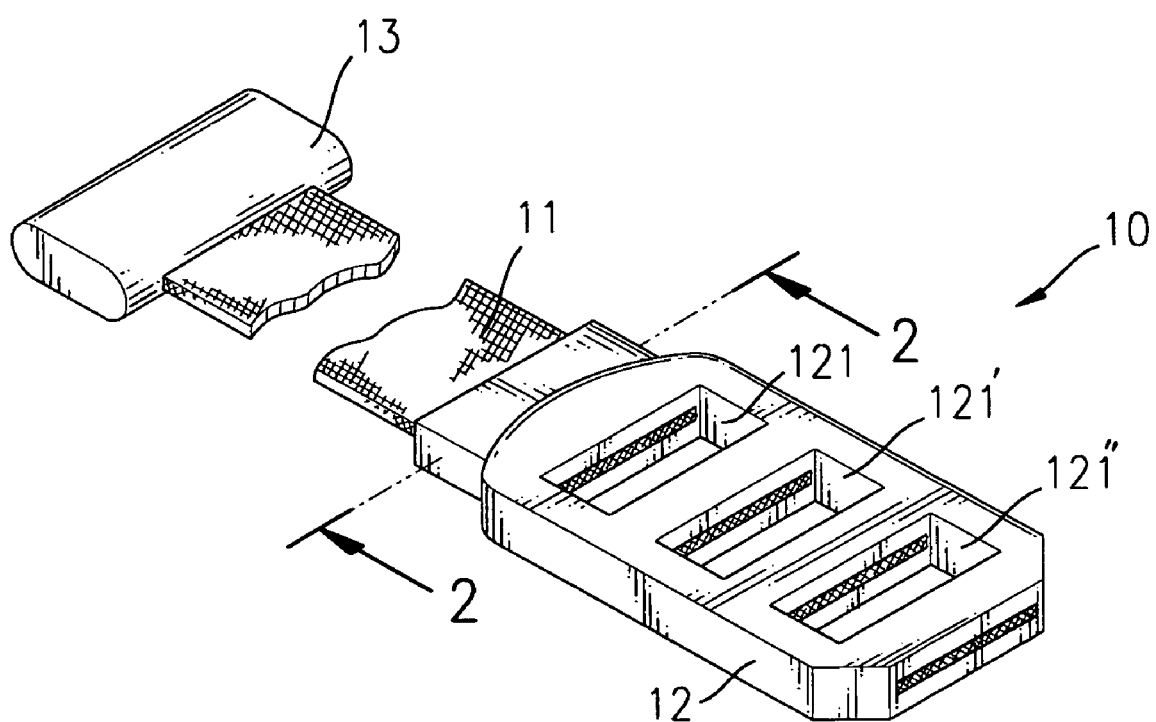
FIG. 1 is a perspective view of a part of a universal carry strap in accordance with the present invention.
Figure 2:
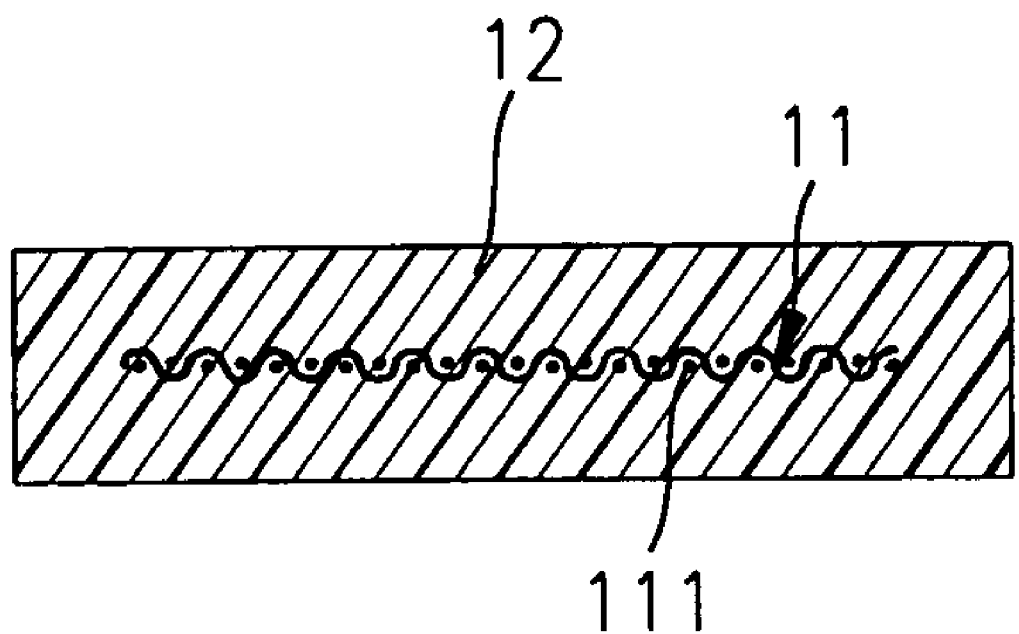
FIG. 2 is an enlarged cross sectional view of an adjustment buckle along 2—2 line in FIG. 1.

With reference to FIGS. 1 and 2, a universal carry strap (10) in accordance with the present invention comprises a long strip (11), an adjustment buckle (12) and a shuttle buckle (13).

The strip (11) is a woven flat strip, comprises multiple interlacing strands (111) and has two opposite ends and a width. The adjustment and the shuttle buckles (12, 13) are respectively attached to the ends of the strip (11). The adjustment and the shuttle buckles (12, 13) are integrally jointed at respective ends of the strip (11) by injection thermoplastic molding. Using the thermoplastic molding to fabricate the adjustment and the shuttle buckles (12, 13) will result the molding thermoplastic to permeate through the strands (111) of the woven strip (11) before the melted thermoplastic becomes solid and being completely combined with the woven strip (11) after the melted thermoplastic becomes solid. Therefore, the carry strap (10) can be used to bear a heavy object that has a weight over 100 kilograms.

The adjustment buckle (12) is a planar and long block and has multiple adjusting through holes including a first, a second and a third adjusting through hole (121, 121', 121"). The adjusting through holes (121, 121', 121") are rectangular holes with respective widths, are defined completely through the adjustment buckle (12) and are arranged in sequence relative to one another. The operations of defining the adjusting through holes (121, 121', 121") will simultaneously cut the strip (11) inside the adjustment buckle (12).

The shuttle buckle (13) is a long thin piece, has a width and can pass selectively through the adjusting through holes (121, 121', 121") in the adjustment buckle (12). The width of the shuttle buckle (13) is greater than the widths of both the strip (11) and the adjusting through holes (121, 121', 121").

Figure 3:
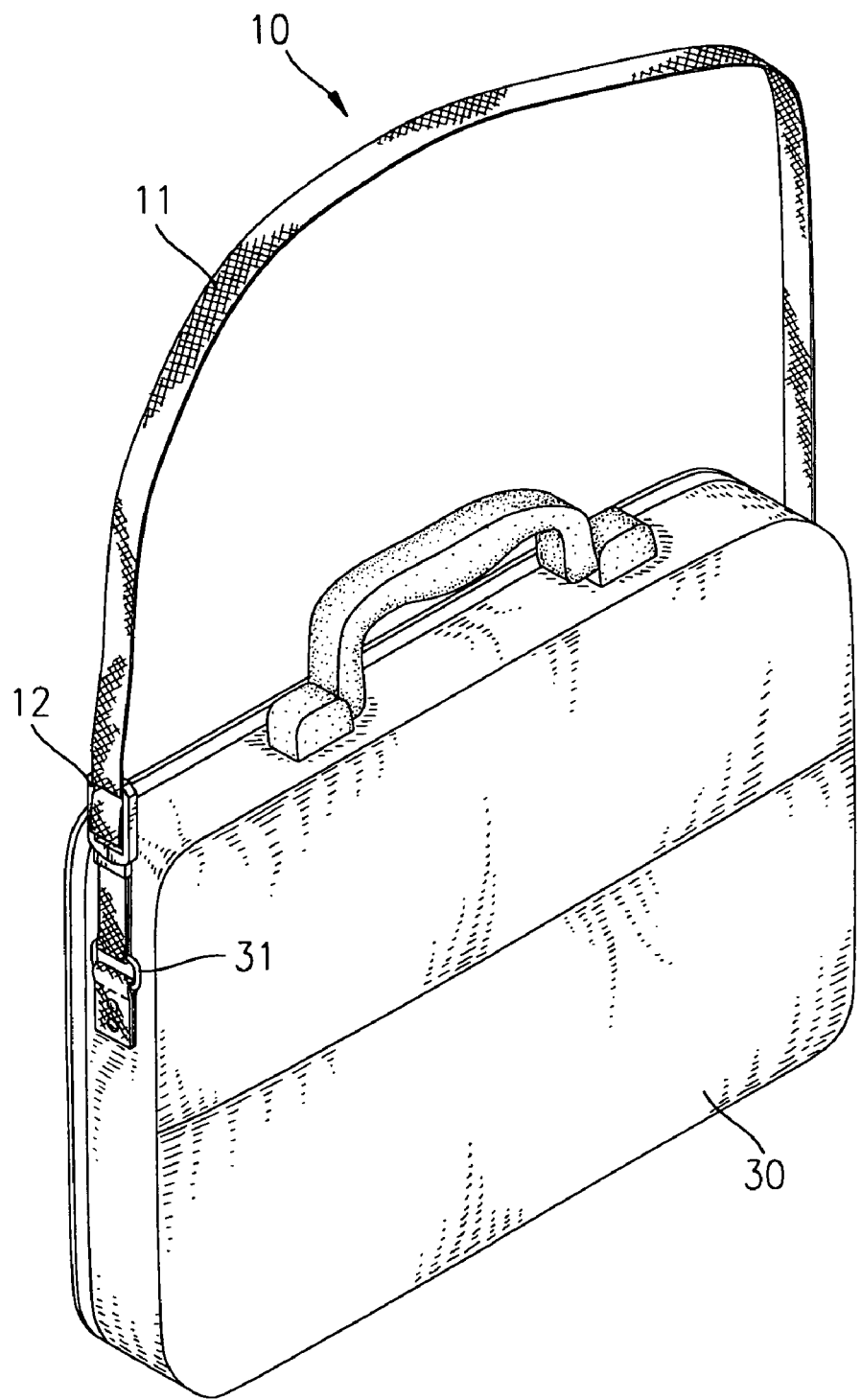
FIG. 3 is an operational perspective view of the universal carry strap to carry a case.
Figure 4:
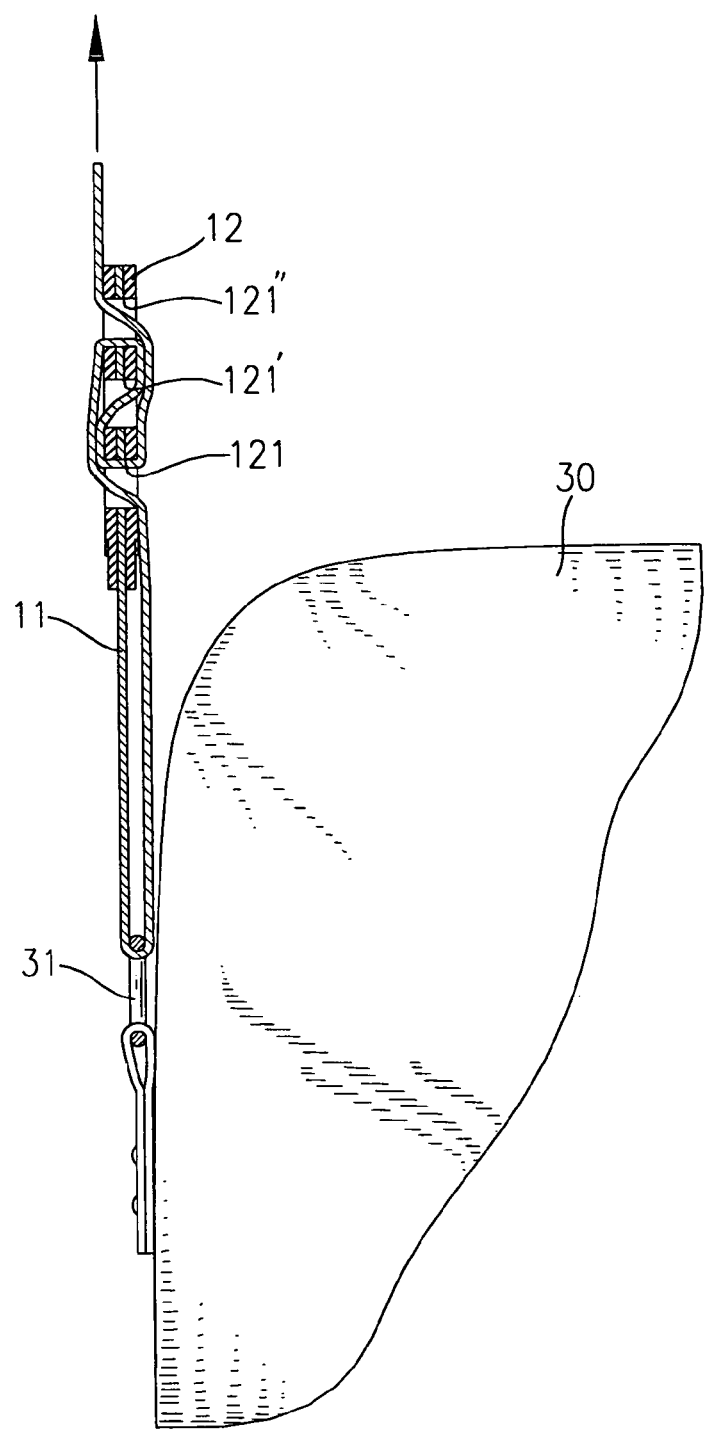
FIG. 4 is an operational elevational view in partial section of the case in FIG. 3, showing a path of a shuttle buckle of the universal carry strap when using the universal carry strap to connect to the case.
Figure 5:
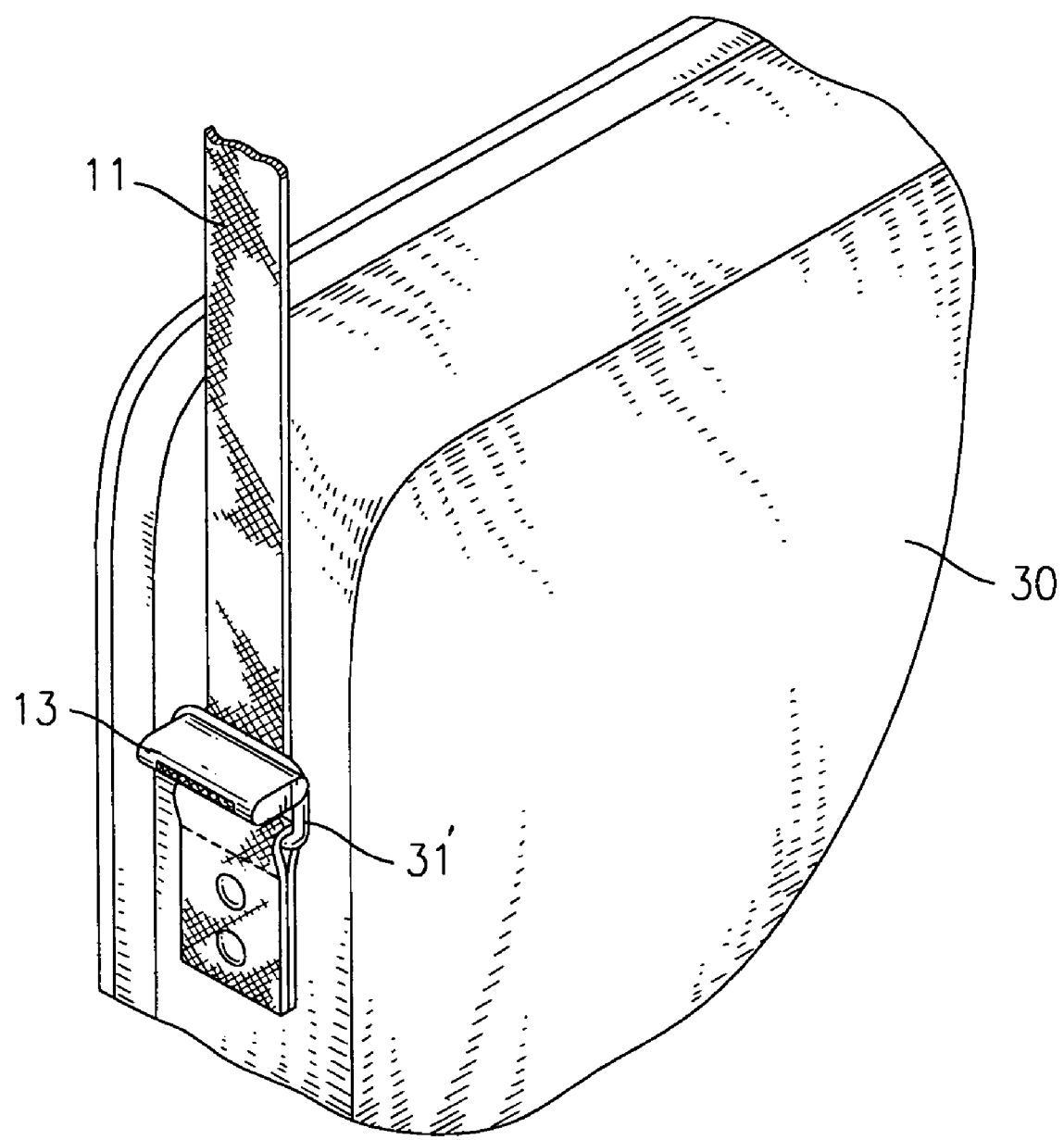
FIG. 5 is an operational perspective view the case in FIG. 4, showing the shuttle buckle engaged a hook ring of the case.

With reference to FIGS. 3, 4 and 5, using and connecting the carry strap (10) to an object such as a case (30) that has a first and a second connecting hook rings (31, 31') is easy, quick and convenient. The shuttle buckle (13) passes through and wraps around the first connecting hook ring (31), and then passes through the first and the third adjusting through holes (121, 121") in the adjustment buckle (12) in order. Selection of passing the shuttle buckle (13) through the adjusting through holes (121, 121', 121") depends on a person's practical needs. Eventually, the shuttle buckle (13) passes through the second connecting hook ring (31') on the case (30) and engages the corresponding second connecting hook ring (31'). Therefore, the carry strap (10) can used to carry the case (30) as a shoulder carry strap.

Sliding the adjustment buckle (12) along the strap (11) allows a length adjustment of the carry strap (10) to accommodate the needs of a person who uses the carry strap (10).

Removing the carry strap (10) from the case (30) is also easy, quick and convenient. The shuttle buckle (13) is returned to pass through the corresponding second connecting hook ring (31') of the case (30), the third and the first adjusting through holes (121", 121) in the adjustment buckle (12) and the first connecting hook ring (31) of the case (30), thereby the carry strap (10) can be completely removed from the case (30).

Figure 6:
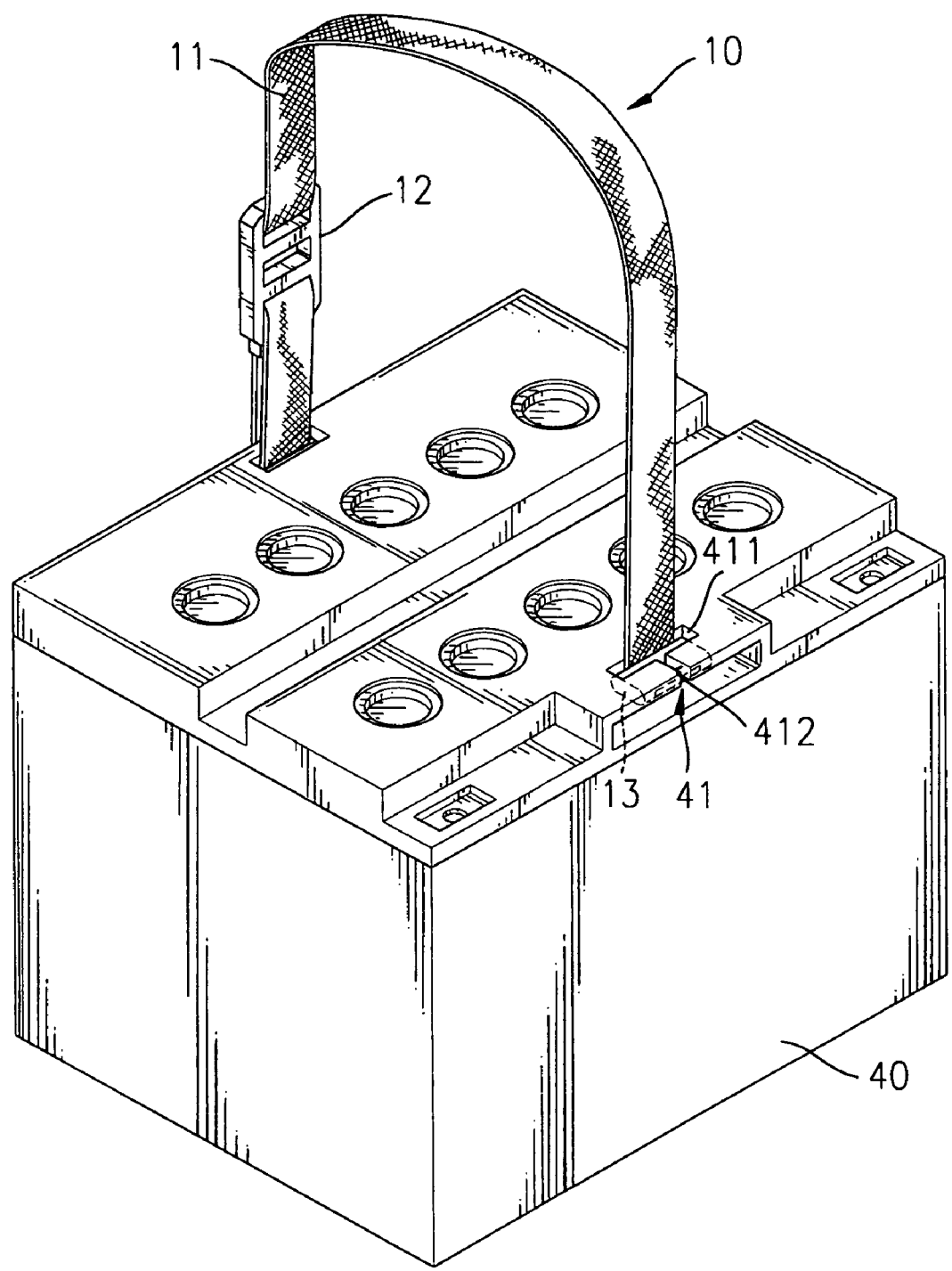
FIG. 6 is an operational perspective view of the universal carry strap in FIG. 1 when the universal carry strap connects to a battery pack.
Figure 7:
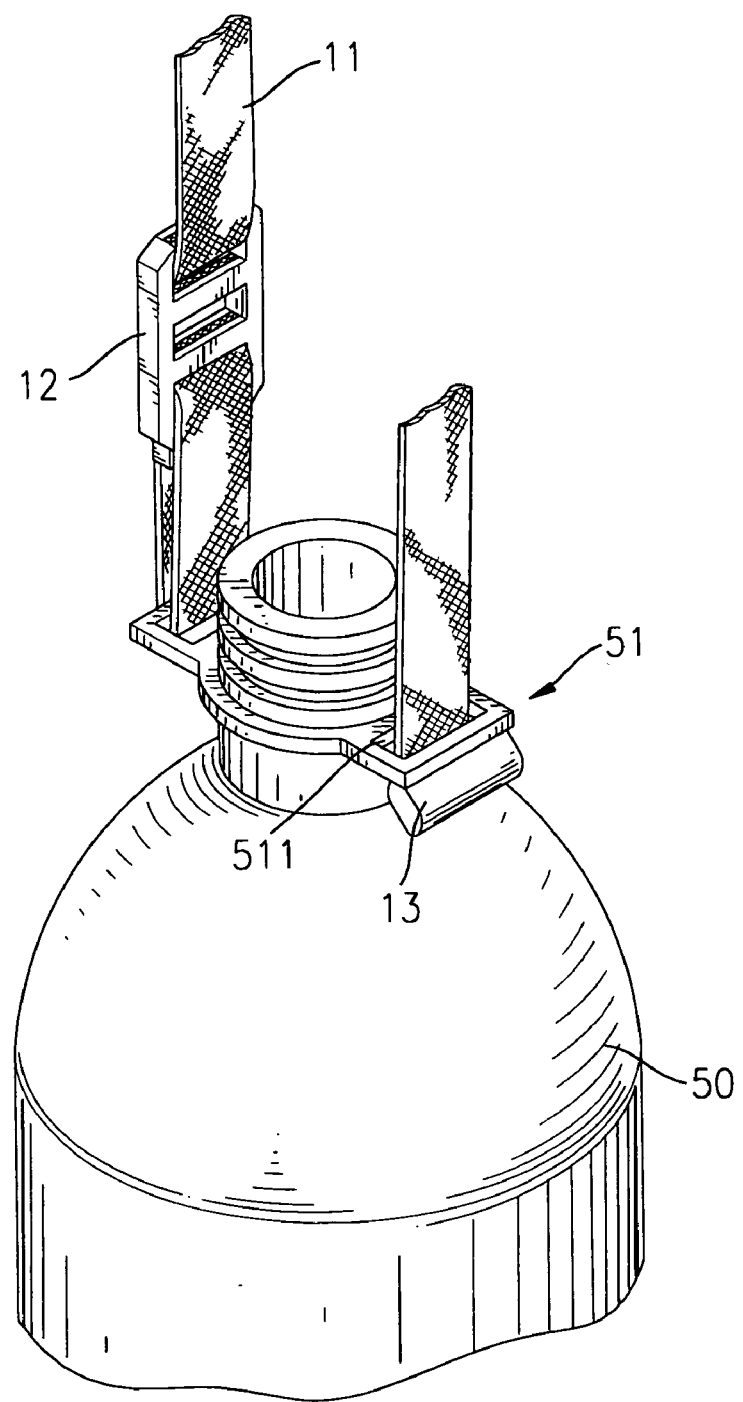
FIG. 7 is an operational perspective view of the universal carry strap in FIG. 1 when the universal carry strap connects to a beverage bottle.
Figure 8:
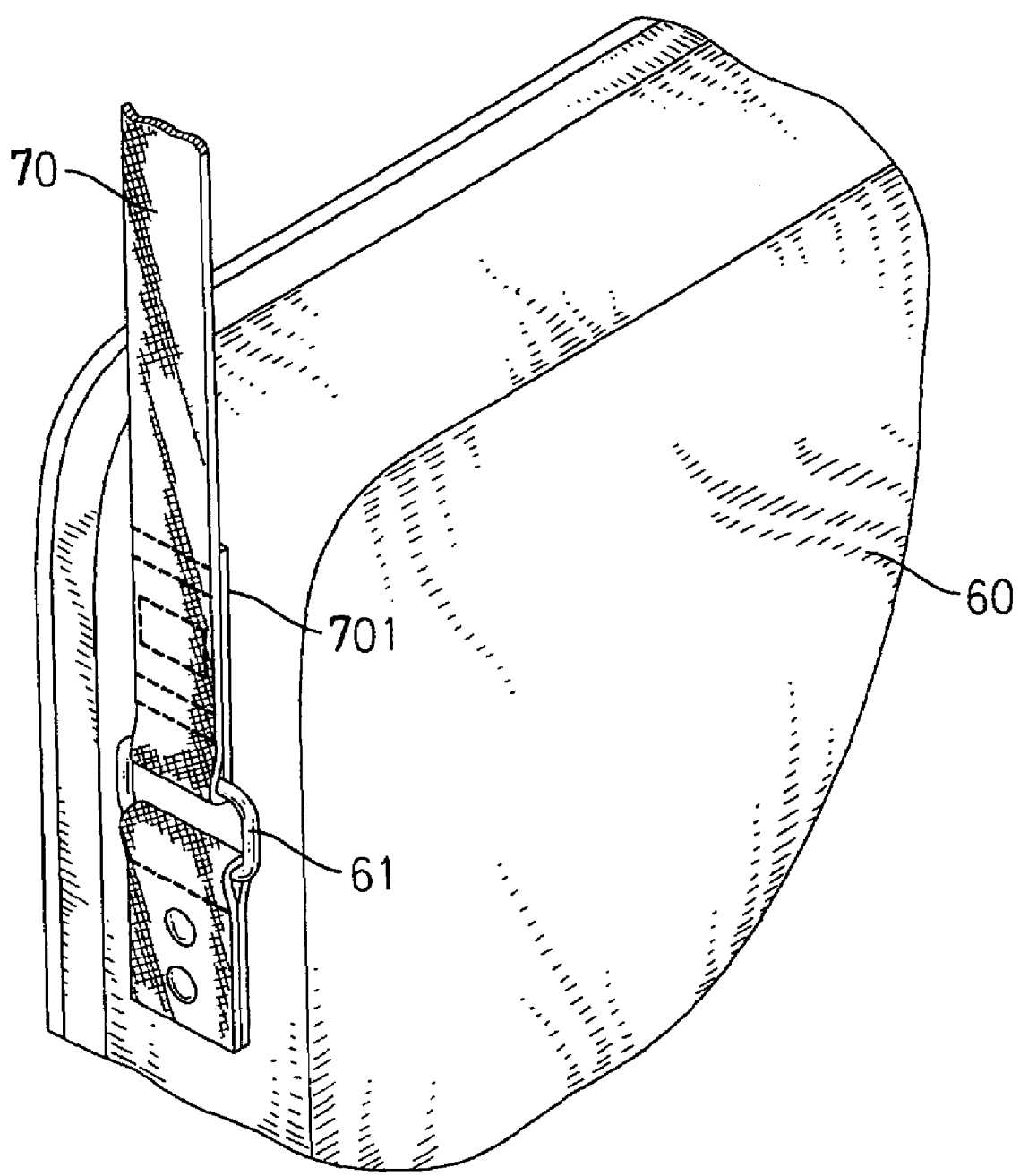
FIG. 8 is an operational perspective view of a conventional carry strap in accordance with the prior art when the conventional carry strap connects to a case.

With reference to FIGS. 6 and 7, the carry strap (10) is convenient to be connected to various objects, such as a battery pack (40) or a beverage bottle (50) when the object has two hollow connecting devices. The battery pack (40) has two connecting seats (41) as the connecting devices. Each of the connecting seats (41) has a through hole (411) and a slot (412) in communication with the through hole (411) and through which the shuttle buckle (13) passes. Likewise, the beverage bottle (50) has two connecting ears (51) as the connecting devices. Each of the connecting ears (51) has a through hole (511) through which the shuttle buckle (13) passes.

Consequently, the carry strap (10) can be used to quickly connect to any object that has two hollow connecting devices, such as hook rings, ears or seats as previously described and can also be quickly removed from the connected objects. The carry strap (10) is universal for connecting to different objects so that the carry strap (10) can be used extensively for carrying the different objects.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the scope of the appended claims.

What is claimed is:

1. A universal carry strap comprising
   a woven strip with two opposite ends and a width comprising multiple interlacing strands; and
   an adjustment buckle and a shuttle buckle made of molding thermoplastic respectively formed integrally at the ends of the woven strip, wherein the molding thermoplastic permeates through the strands of the woven strip, and the shuttle buckle has a width greater than the width of the woven strip;
   wherein the adjustment buckle has multiple adjusting through holes for the shuttle buckle passing selectively through, and each of the adjusting through holes has a width, and the width of the shuttle buckle is greater than the width of each of the adjusting through holes.

2. The universal carry strap as claimed in claim 1, wherein the adjusting through holes comprise a first, a second and a third adjusting through hole arranged in order.

3. The universal carry strap as claimed in claim 1, wherein the adjustment buckle is a planar and long block.

* * * * *